(No Model.) 2 Sheets—Sheet 1.
A. D. PECK.
Vehicle Wheel.
No. 242,033. Patented May 24, 1881.
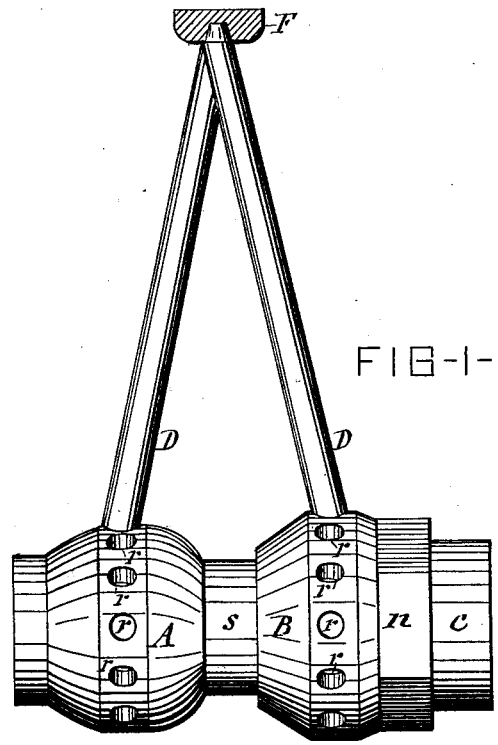
FIG-1-
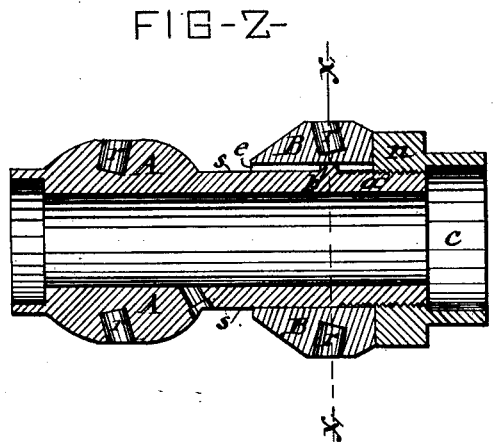
FIG-2-
WITNESSES:
Wm C. Raymond
L. Bendixen.
INVENTOR:
Aaron D. Peck
Geo Duell, Lassat Hey
his Attys (No Model.) 2 Sheets—Sheet 2.
A. D. PECK.
Vehicle Wheel.
No. 242,033. Patented May 24, 1881.
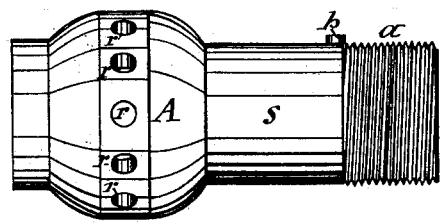
FIG-3-
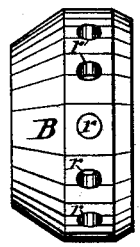
FIG-4-
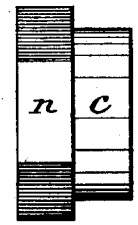
FIG-5-
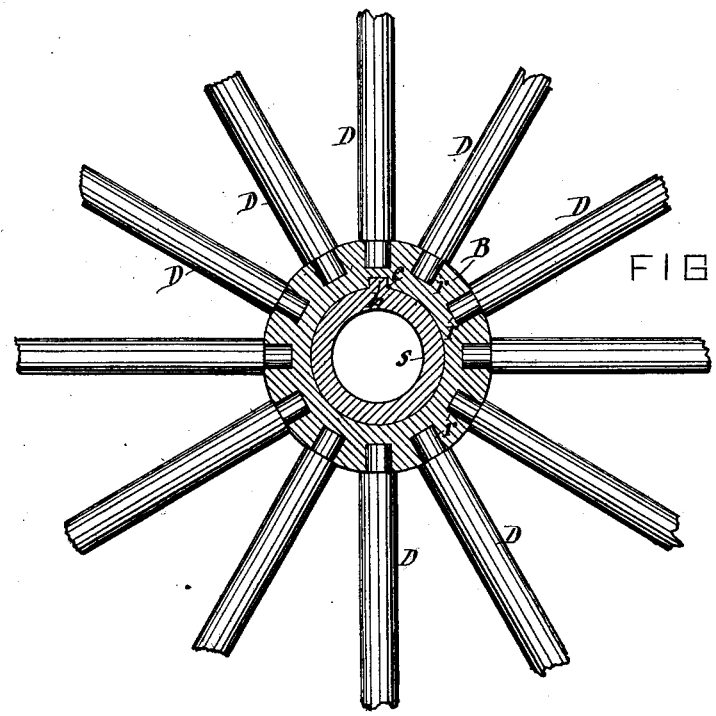
FIG-6-
WITNESSES:
C. Bendixen
Wm C. Raymond
INVENTOR
Aaron D. Peck
per Dull, Lassat Hay
his Attys

UNITED STATES PATENT OFFICE.

AARON D. PECK, OF JORDAN, NEW YORK.

VEHICLE-WHEEL.

SPECIFICATION forming part of Letters Patent No. 242,033, dated May 24, 1881.

Application filed March 1, 1881. (No model.)

*To all whom it may concern:*

Be it known that I, AARON D. PECK, of Jordan, in the county of Onondaga, in the State of New York, have invented new and useful Improvements in Vehicle-Wheels, of which the following, taken in connection with the accompanying drawings, is a full, clear, and exact description.

This invention relates to improvements in that class of wheels which have a duplex hub in the form of two rings having each a set of complete spoke-sockets, which rings are made adjustable in their proximity to each other, and two sets of spokes extending respectively from said rings or single hubs and converging to the felly.

The improvement consists in making the outer ring or hub integral or in one piece with a rearwardly-extended sleeve having a threaded portion at its rear extremity, and applying to the latter a combined adjusting-nut and sand-box, operating against the rear hub, which slides on the aforesaid sleeve and is restrained from rotating thereon, by which improvement the construction of the wheel is simplified and cheapened and the wheel is rendered more rigid and durable.

In the accompanying drawings, Figure 1 is a side view of my improved wheel-hub and its connection with the felly; Fig. 2, a longitudinal section of said hub; Figs. 3, 4, and 5 are detached views of the constituent parts of the hub, and Fig. 6 a transverse section on line $xx$ in Fig. 2.

Similar letters of reference indicate corresponding parts.

A and B represent two parts of a wheel-hub, each of the parts being in the form of a complete hub, having a series of sockets, $r\,r$, for the reception of a set of spokes, D, which are oblique and converge with the spokes of the other part toward the felly F. The hub A is rigidly attached to or has integral with it a sleeve, $s$, which constitutes the journal-box. Upon the sleeve $s$ slides longitudinally the hub B, and against the back of said hub presses a nut, $n$, applied to an externally screw-threaded end portion, $a$, of the sleeve $s$. The hub B is prevented from rotating on the sleeve $s$ by a feather or lug, $b$, on the exterior of the latter engaging a longitudinal groove, $e$, in the interior of the former.

By turning the nut $n$ so as to cause it to advance toward the hub B said hub is crowded toward the hub A. The approach of the two hubs A and B brings the spokes nearer a perpendicular line, thereby distending the periphery of the wheel, and consequently tightening the tire; or, in case the felly consists of a metal ring, said felly and spokes become thus tightened. The nut $n$ has a rearward-projecting ring, $c$, encompassing the axle, to serve as the so-called sand-box, usually applied to the rear end of wheel-hubs for excluding dust and sand from the journal of the wheel.

Having described my invention, what I claim as new, and desire to secure by Letters Patent, is—

The improved wheel-hub herein described, consisting of the outer hub, A, made integral with the rearwardly-extended sleeve, $s$, and having the threaded portion $a$ at the rear extremity of said sleeve, in combination with the sliding hub B and the combined adjusting-nut and sand-box $n\,c$, all constructed and combined substantially in the manner described and shown.

In testimony whereof I have hereunto signed my name and affixed my seal, in the presence of two attesting witnesses, at Jordan, in the county of Onondaga, in the State of New York, this 24th day of February, 1881.

AARON D. PECK. [L. S.]

Witnesses:
GEO. B. GARRISON,
ALBERT W. HARWOOD.